United States Patent [19]

Kodama

[11] 4,356,499
[45] Oct. 26, 1982

[54] INK-JET RECORDING DEVICE

[75] Inventor: Yutaka Kodama, Tokyo, Japan

[73] Assignee: Ricoh Co., Ltd., Tokyo, Japan

[21] Appl. No.: 208,301

[22] Filed: Nov. 19, 1980

[30] Foreign Application Priority Data

Nov. 28, 1979 [JP] Japan .................................. 54/153839

[51] Int. Cl.³ ............................................ G01D 15/18
[52] U.S. Cl. .................................. 346/75; 346/140 R
[58] Field of Search ........................... 346/1.1, 75, 140

[56] References Cited

U.S. PATENT DOCUMENTS

| | | | |
|---|---|---|---|
| 3,341,859 | 9/1967 | Adams | 346/140 PD |
| 3,737,914 | 6/1973 | Hertz | 346/75 |
| 3,805,273 | 4/1974 | Brady et al. | 346/75 |
| 3,953,862 | 4/1976 | Amberntsson et al. | 346/140 PD |
| 4,158,847 | 6/1979 | Heinzl et al. | 346/140 PD |
| 4,215,350 | 7/1980 | Mielke et al. | 346/140 PD X |

Primary Examiner—Donald A. Griffin
Attorney, Agent, or Firm—Burgess, Ryan and Wayne

[57] ABSTRACT

An ink-jet recording device in which the pressurized ink is supplied from a single source of pressurized ink to an ink manifold with one inlet port and a plurality of outlet ports each of which is connected to one end of a flexible pipe the other end of which is connected to an ink emission head, whereby the pressurized ink is supplied from the ink manifold to the ink emission head. The ink manifold is hollow and the inlet and outlet ports are communicated with each other through the hollow space. Alternatively, inserted into the ink manifold is an ink distributor having a plurality of branches which are in alignment with said outlet ports and are spaced apart from each other. An ink flow control means is disposed in each branch. The ink manifold is provided with a common ink passage or chamber which is communicated with an air vent means so that air bubbles trapped in the ink passage or chamber may be vented.

12 Claims, 13 Drawing Figures

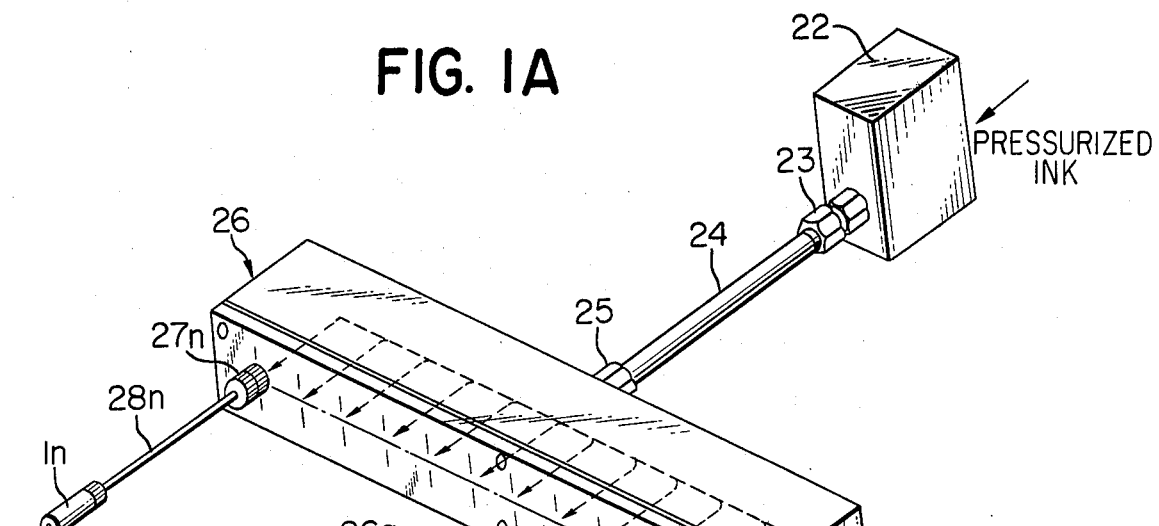
FIG. IA
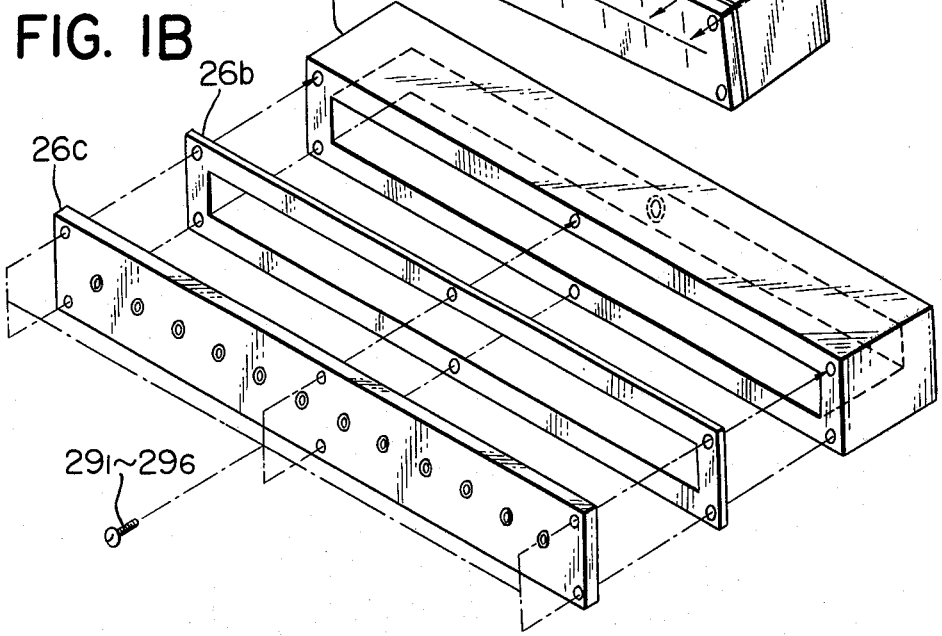
FIG. IB
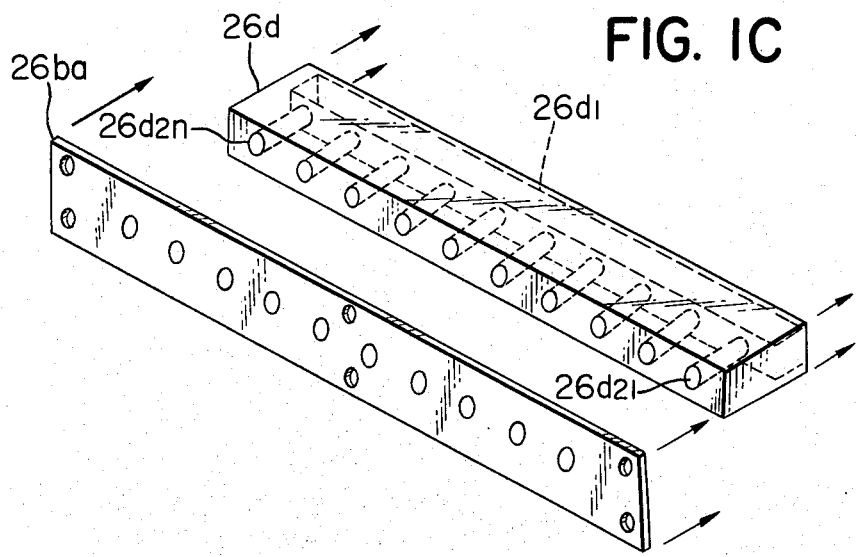
FIG. IC

INK-JET RECORDING DEVICE

BACKGROUND OF THE INVENTION

The present invention generally relates to an ink-jet recording device of the type having a plurality of ink emission heads which simultaneously emit or issue ink jets and more particularly an ink-jet recording of the type in which the pressurized ink is supplied to each ink emission head applied with a periodic pressure variation by a piezoelectric element mounted thereon so that the ink jet issued from the head breaks up into uniform ink drops; and the ink drops are selectively charged and the charged drop is deflected when it passes between a pair of deflection plates.

In the conventional ink-jet recording device of the type described, each one end of cylindrical piezoelectric elements; that is, ink emission heads is connected at a predetermined pitch to the front wall of a hollow casing. However, it is extremely difficult to connect the ink emission heads to the casing in such a way that all the ink jets issued or emitted from the ink emission heads are correctly aligned with each other. It follows, therefore, that it is preferable that the ink emission heads are so mounted that the direction of ink jet can be adjusted. When each ink emission head is supplied with the pressurized ink from an individual source of pressurized ink consisting of, for example, a pump and an accumulator, the pressure varies from one source to another. In addition, the flow resistance varies depending upon the length of a pipe or the like connecting between the ink source and the ink emission head. Thus, it is next to impossible to attain the uniform ink jet emission characteristics of all ink emission heads.

SUMMARY OF THE INVENTION

A first object of the present invention is, therefore, to equalize the pressure of ink supplied to a plurality of ink emission heads.

A second object of the present invention is (a) to mount the ink emission heads in such a way that each of them can be adjusted in position independently of each other, whereby the direction of ink jet emission can be adjusted and (b) to supply the ink to the ink emission heads from a single source of pressurized ink.

A third object of the present invention is to provide an ink-jet recording device in which the pressurized ink is supplied to the ink emission heads from a single source of pressurized ink so that the uniform ink jet emission characteristics of all ink emission heads can be attained.

A fourth object of the present invention is to provide an ink-jet recording device in which the ink jet emission heads can be adjusted in position so that a desired ink drop trajectory and subsequently a desired ink drop landing position can be determined.

To the above and other ends, according to the present invention, the pressurized ink is supplied from a single source of pressurized ink to an ink manifold with one inlet port and a plurality of outlet ports. One end of a flexible pipe or tubing is connected to each outlet port and the other end thereof is connected to an ink jet emission head so that the pressurized ink is supplied to the latter from the ink manifold. The ink manifold is hollow and the inlet and outlet ports are communicated with each other through the hollow space. Alternatively, inserted into the ink manifold is an ink distributor with a plurality of branches which are aligned with the outlet ports and are spaced apart from each other. An ink flow control means is disposed in each branch and may be a stop valve, a pressure regulating valve or a combination thereof.

The ink manifold is formed with a common ink passage or chamber the upper portion of which is communicated with an air vent means so that air bubbles trapped in the common passage or chamber can be vented, whereby the ink jet emission condition can be improved.

Thus, according to the present invention, the ink under pressure can be supplied to a plurality of ink jet emission heads from a single source of pressurized ink. In addition, the ink jet emission heads can be adjusted in position independently of each other. Furthermore, the connecting pipes between the ink manifold and the ink jet emission heads are all equal in length so that the flow resistance becomes same and consequently all ink jet emission heads are supplied with the ink under the same pressure.

BRIEF DESCRIPTION OF THE DRAWINGS

FIG. 1A is a perspective view of a preferred embodiment of the present invention;

FIG. 1B is an exploded perspective view thereof;

FIG. 1C is an exploded perspective view of a modification thereof;

DESCRIPTION OF THE PREFERRED EMBODIMENTS

Figure 2A:
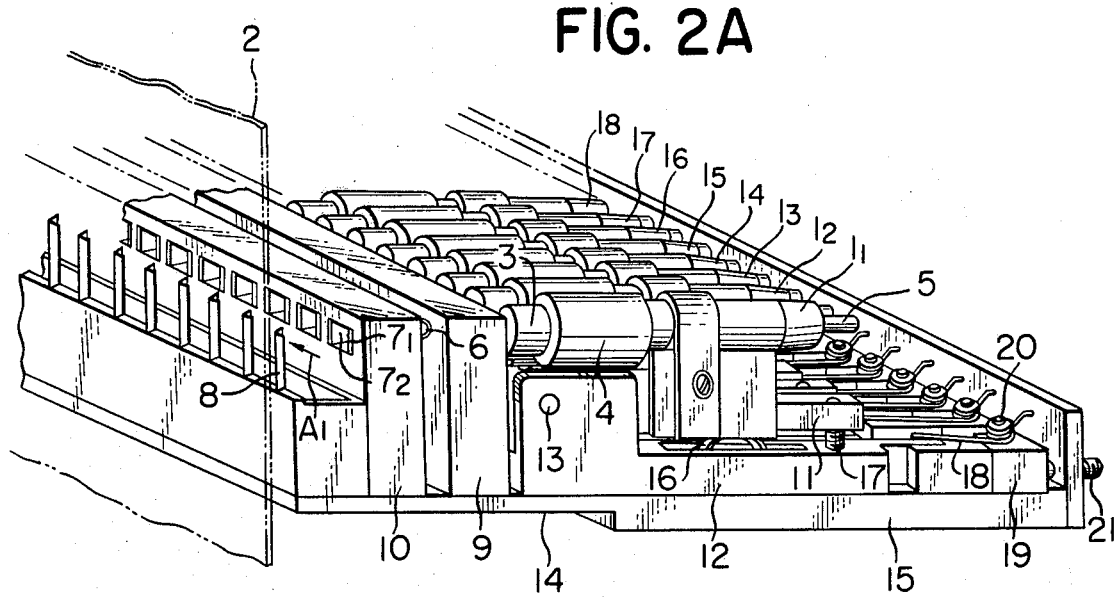
FIG. 2A is a perspective view illustrating the array of ink jet emission heads.

FIGS. 1A and 1B show a first embodiment of the present invention. Numeral 22 shows a solenoid-controlled valve. Ink discharged from a pump is supplied through an accumulator. One end of an ink supply pipe 24 is joined with a coupling 23 to the valve 22 while the other end is joined with a coupling 25 to the ink inlet of an ink manifold 26. The ink manifold 26 is hollow and has a side wall formed with an array of ink outlets (only one is shown in FIG. 1A) each of which is connected with a coupling 27$n$ to one end of a flexible ink supply tube 28$n$ of one millimeter in diameter and the end of the supply tube 28$n$ is connected to an ink emission head 1$n$.

FIG. 1B is an exploded perspective view of the ink manifold 26 consisting of a box-shaped casing 26a with one side wall opened, a packing 26b and the front side wall 26c formed with an array of ink outlets. They are assembled in the order shown in FIG. 1B with six screws $29_1$ through $29_6$ as shown in FIG. 1A.

In order to uniformly distribute the ink to the ink outlets, as shown in FIG. 1C, a groove $26d_1$ is formed as a common ink passage within an ink distributor 26d and is communicated with ink distribution holes $26d_{21}$ through $26d_{2n}$ which are aligned with the ink outlets of the front side wall 26c. The ink distributor 26d is inserted into the casing 26a. As shown in FIG. 1C, a packing 26ba is formed with an array of holes which are aligned with the ink outlets of the front side wall 26c. In FIG. 1C, a packing 26ba is used as another example, which has an array of holes. The front side wall 26c, the packing 26ba and the casing 26a in which is inserted the ink distributor 26d are assembled into a unitary construction with the screws $29_1$ through $29_6$. The thickness or width of the ink distributor 26d is determined almost equal to the depth of the opening in the casing 26a so that the front side of the ink distributor 26d may be made into intimate contact with the packing 26ba (FIG. 1C).

Figure 2B:
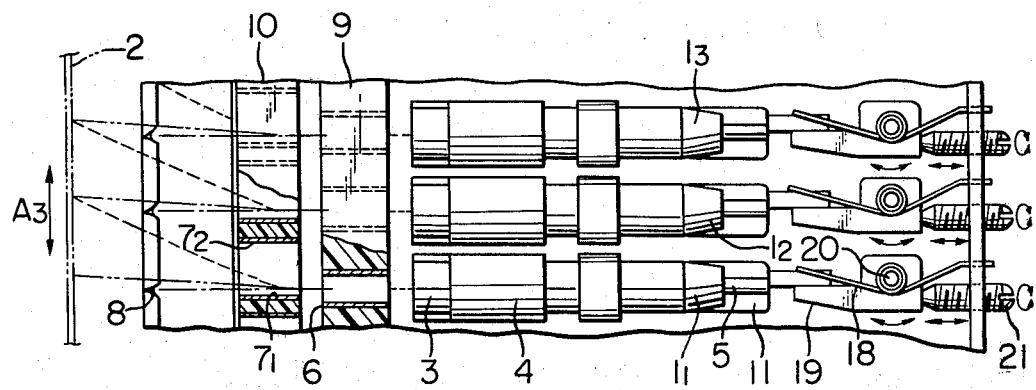
FIG. 2B is a fragmentary top view thereof.
Figure 2C:
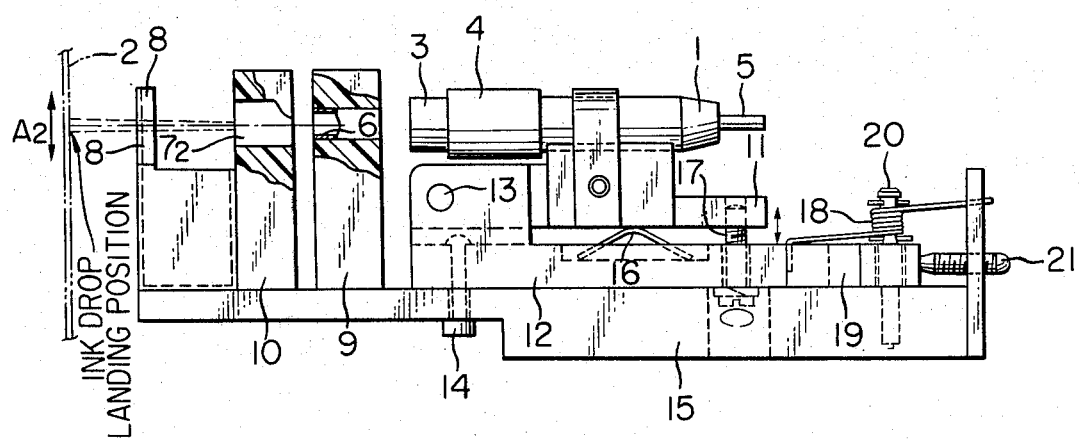
FIG. 2C is a side view thereof.

Next, two examples of the array of ink emission heads from $1_l$ to $1_n$ connected to the ink manifold 26 will be described. A first example is shown in FIG. 2A. The heads $1_l$ through $1_n$ are mounted on a base 15 and one end of the flexible tube $28_n$ is connected to a connecting pipe 5 of each head $1_n$. FIG. 2B is a fragmentary top view of the print head shown in FIG. 2A and FIG. 2C is a side view thereof. It is seen that a plurality of ink emission heads $1_l$ through $1_n$ are arranged transversely of a recording paper 2. Each ink emission head has a hollow pipe 3 fitted with a cylindrical piezoelectric element 4. The pressurized ink is fed through the connecting pipe 5 into the hollow pipe 3. The piezoelectric element 4 imparts the oscillation of a predetermined frequency to the ink to be emitted so that the ink jet is broken up into uniform ink drops at a predetermined position spaced apart from the ink emission head by a predetermined distance. A cylindrical charge electrode 6 is located at the position at which the ink jet breaks up into ink drops and the charge voltage which increases stepwise is applied to the charge electrode 6 so that the charges acquired by the ink drops change also stepwise. When the charged ink drop passes between deflection plate pair $7_1$ and $7_2$, it is deflected through an angle in proportion to the charge on the ink drop in the direction indicated by the arrow A1 and lands on the recording paper 2. The uncharged ink drop flies straight and is trapped by a gutter 8. The cylindrical charge electrode 6 is embedded in an electrode base or holder 9, and the deflection plates $7_1$ and $7_2$ are joined to the inside walls of the ink drop passage through an electrode base or holder 10. The ink emission head $1_l$ is mounted on a first supporting member 11 whose one end is pivoted with a first pivot pin 13 to a second supporting member 12 whose one end in turn is pivoted with a second pivot pin 14 to the base 15. Therefore, the first supporting member 11 is swingable about the first pivot pin 13 while the second supporting member 12 is swingable about the second pivot pin 14. A leaf spring 16 is loaded between the first and second supporting members 11 and 12 so that the first supporting member 11 is normally rotated in the counterclockwise direction. A first adjusting screw 17 is extended through a hole (FIG. 2C) of the second supporting member 12 and screwed into the other end of the first supporting member 11. When the adjusting screw 17 is tightened, the first supporting member 11 is caused to rotate in the clockwise direction about the first pivot pin 13, but when the adjusting screw 17 is loosened, the supporting member 11 is caused to rotate in the counterclockwise direction. As a consequence, the axis of the ink emission head $1_l$ can be displaced vertically as indicated by the double-pointed arrow A2 in FIG. 2C; that is, in the direction in which the recording paper 2 is transported. The second supporting member 12 is biased with a coiled spring 18 so that the former is caused to rotate in the clockwise direction (FIG. 2C) about the second pivot pin 14. The second supporting member 12 engages with a stopper 19 which supports the coiled spring 18 and is pivoted with a third pivot pin 20 to the base 15. Under the force of the coiled spring 18, the second supporting member 12 applies the rotating force to the stopper in the counterclockwise direction (FIG. 2B), but the stopper 19 is locked by a second adjusting screw 21. When the second adjusting screw 21 is tightened, the stopper 19 is caused to rotate in the clockwise direction so that the second supporting member 12 is caused to rotate in the counterclockwise direction. On the other hand, when the second adjusting screw 21 is loosened, the stopper 19 is caused to rotate in the counterclockwise direction so that the second supporting member 12 is caused to rotate in the clockwise direction. In consequence, the axis of the ink emission head $1_l$ can be displaced in the horizontal direction as indicated by the double-pointed arrow A3 in FIG. 2B; that is, in the transverse direction of the recording paper 2.

Other ink emission heads $1_2$ through $1_n$ are mounted exactly in the manner described above; that is, each have a first supporting member, a second supporting member, a first pivot pin, a second pivot pin, a leaf spring, a first adjusting screw, a coiled spring, a stopper, a third pivot pin and a second adjusting screw. Therefore, the axis of each head can be displaced vertically and horizontally by tightening or loosening the first and second adjusting screws 17 and 21 as described above so that the ink drop landing position can be adjusted in the directions indicated by the arrows A2 and A3. Thus, the ink drop landing positions can be aligned first vertically (in the direction indicated by the arrow A2) by tightening or loosening the first adjusting screws 17 and then by tightening or loosening the second adjusting screws 21, the ink drop landing positions can be equally spaced apart in the horizontal direction A3.

Figure 3A:
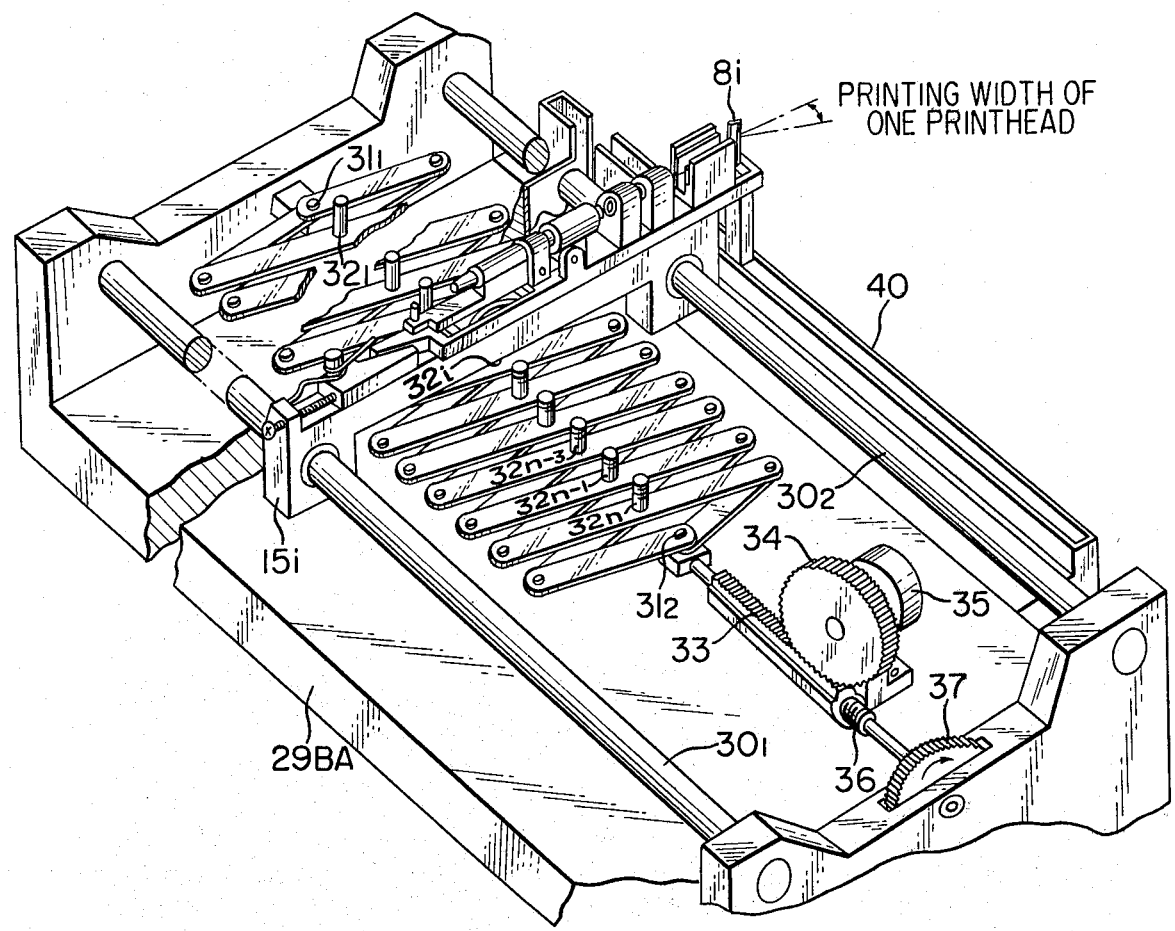
FIG. 3A is a perspective view illustrating another example of the array of ink jet emission heads.
Figure 3B:
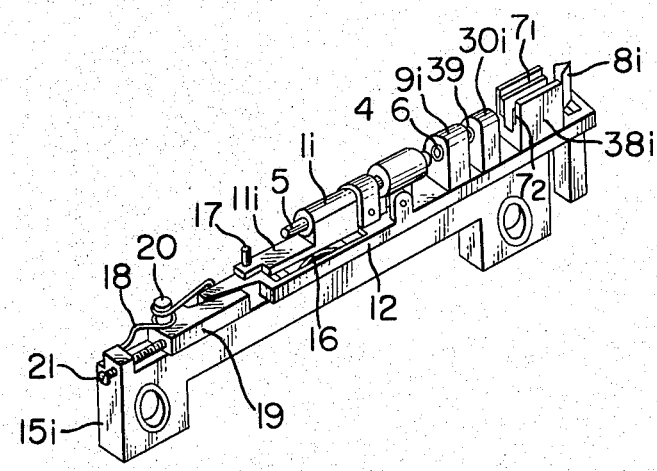
FIG. 3B is a perspective view of a print head unit including one ink jet emission head and its associated charge electrode, charge detection electrode and deflection plates.

Next, referring to FIGS. 3A and 3B, a second embodiment or example of the present invention is described in conjunction with a printer capable of varying printing pitches. An accordion linkage is provided by connecting a plurality of parallel linkages with link arms and pivot pins. One end of the accordion linkage is pivoted with a pivot pin $31_1$ to a base $29_{BA}$ while the other end is pivoted with a pivot pin $31_2$ to one end of a rack 33. An internally threaded hole at the other end of the rack 33 is engaged with an externally threaded end of a shaft 36 of an adjusting knob 37 rotatably mounted on the base $29_{BA}$. The adjusting knob 37 is prevented to move in the direction of the center line of the shaft 36 by the base $29_{BA}$. When the knob 37 is rotated in the direction indicated by the arrow in FIG. 3A, the rack 33 is caused to be dragged toward the knob 37 and consequently the accordion linkage is extended, but when the knob 37 is rotated in the opposite direction, the accordion linkage is folded or becomes shorter. Except the end pivot pins $31_1$ and $31_2$, all the center pivot pins $32_1$ through $32_n$ of the accordion linkage have externally threaded screws so that each of them can be connected to respective head base $15_l$ through $15_n$ (only one $15_i$ being shown). The head base $15_i$ is slidably guided by a pair of parallel guide bars $30_1$ and $30_2$.

The print head unit mounted on the base $15_i$ is substantially similar in construction to the unit described previously with reference to FIGS. 2A, 2B and 2C except that a charge detection electrode 39 is mounted between the charge electrode 6 and the deflection plates $7_1$ and $7_2$ as best shown in FIG. 3B. More specifically, the second supporting member 12 is pivoted to the base $15_i$ so that it can be rotated in the horizontal direction. The cam 19, which is referred to as "the stopper 19" in the first embodiment, is pivoted on the base $15_i$ with the third pivot pin 20 and is made into engagement with the other end of the second supporting member 12. The coiled spring 18 which is supported by the third pivot pin 20 is loaded between the base $15_i$ and the second supporting member 12 so that the latter 12 is normally biased in the counterclockwise direction. The rotating force is transmitted to the cam or stopper 19, but the latter remains stationary because it is held by the second adjusting screw 21. As described elsewhere, when the second adjusting screw 21 is tightened, the cam or stopper 19 is caused to rotate in the counterclockwise direction so that the second supporting member 12 is caused to rotate in the clockwise direction against the power of the coiled spring 18. On the other hand, when the second adjusting screw 21 is loosened, the second supporting member 12 is caused to rotate in the counterclockwise direction. Thus, the axis of the ink emission head 1 can be displaced in a horizontal plane as described previously. One end of the first supporting member $11_i$ is pivoted to one end of the second supporting member and the first or leaf spring 16 is loaded between the first and second supporting members 11; and 12. The first adjusting screw 17 is extended through the second supporting member 12 and screwed into the other end of the first supporting member 11. As the first adjusting screw 17 is tightened or loosened, the first supporting member $11_i$ is pivoted vertically about the first pivot pin, whereby the axis of the ink emission head 1 is vertically displaced as described previously.

The ink emission head 1, which is supported on the first supporting member 11, is supplied with the pressurized ink through the flexible tube 28 (FIG. 1A) and the connecting pipe 5. A small pressure variation is caused in the ink in the ink emission head 1 by the piezoelectric element 4 so that the ink jet issued from the ink emission head 1 breaks up into uniform ink drops.

The electrode holders $9i$, $30i$ and $38i$ (which is referred by 10 in the first embodiment) with the charge electrode 6, the detection electrode 39 and the deflection plates $7_1$ and $7_2$, respectively, and the gutter $8i$ are also mounted on the second supporting member 12. The ink jet issued from the ink emission head 1 breaks up into ink drops in the charge electrode 6 and acquire charges when the charge electrode 6 is energized. The charged ink drop is deflected when it passes between the deflection plates $7_1$ and $7_2$ and is placed on the recording paper. The angle of deflection is dependent upon the charge on each ink drop. In this manner, the print head unit prints images or characters on the paper over a predetermined width (FIG. 3A). The uncharged ink drops are trapped by the gutter $8i$.

The trapped ink drops are collected in a tray or the like 40 below the gutter $8i$ and recirculated into an ink reservoir (not shown) through a filter (not shown).

The print head unit of the type just described above is connected to every center pivot pins $32_l$ through $32_n$.

Assume that the ink emission heads or print head units are controlled in a character printer system mode. When the adjusting knob 37 is rotated in the direction indicated by the arrow, the accordion linkage is extended so that the pitch between the print head units is increased and consequently the width or length of one line printed by the print head (consisting of the print head units) is increased. Regardless of the degree of extension of the accordion linkage, the pitch between the print head units can be maintained uniform. Therefore, in the copy mode in which the adjacent print head units cooperate to print a single pattern, the charging voltage, the deflection voltage and/or the distance between the print head or base $29_{BA}$ and the recording paper are adjusted depending upon the degree of extension of the accordion linkage in such a way that the printing width of each print head unit is suitably adjusted, whereby the continuity between a pattern printed by one print head unit and a pattern printed by its adjacent print head unit or units can be maintained.

The rack 33 is in mesh with a pinion 34 which is fixed on the rotating shaft of a potentiometer 35. The output from the potentiometer 35 can be used for displaying a printing pitch.

In both the first and second embodiments, the ink emission heads $1_l$ through $1_n$ are connected through the flexible tubes $28_l$ through $28_n$ of an equal length to the ink manifold.

Figure 4A:
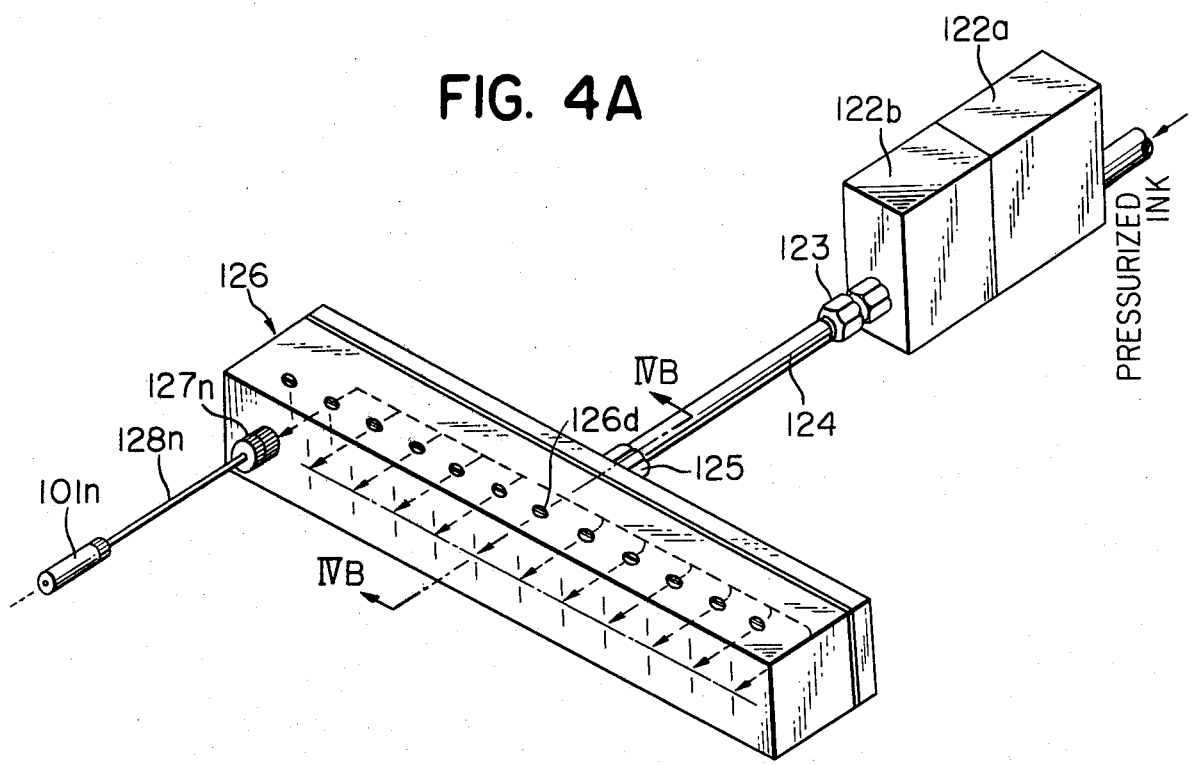
FIG. 4A is a perspective view of another preferred embodiment of the present invention.

Referring to FIG. 4A, 122a is an accumulator and 122b, a solenoid-operated valve. The ink under pressure is supplied from a pump to the accumulator 122a. One end of an ink supplying pipe 124 is connected with a coupling 123 to the solenoid-operated valve 122b while the other end of the pipe 124 is connected with a coupling 125 to an inlet port of the ink manifold 126 having a number of n ink outlets opened in the front side wall. One end of a flexible ink supply tube 128n having a diameter of 1 mm is connected with a coupling 127n to each ink outlet while the other end is connected with a coupling to an ink emission head 101n.

Figure 4B:
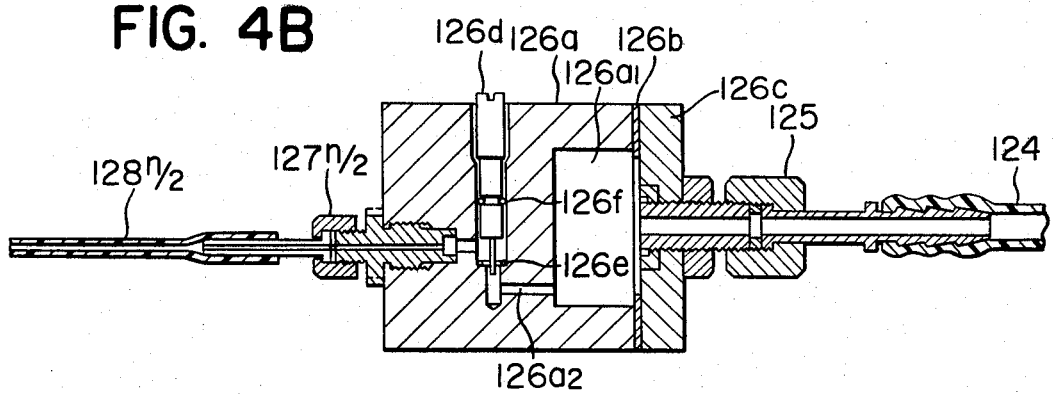
FIG. 4B is a sectional view taken along the line IV-B—IVB of FIG. 4A.

FIG. 4B is a sectional view taken along the line IVB—IVB of FIG. 4A. In general, the ink manifold 126 comprises a main body 126a, a packing 126b and a cover plate 126c. The main body 126 is formed with a common or main passage 126a1 and a number of n branches 126a2 which are communicated with the ink outlets. A screw type adjusting valve 126d is inserted into the passage between the branch 126a2 and its corresponding ink outlet. 126e is an O-ring and 126f is also an O-ring for preventing the leakage of ink. When the valve 126d is tightened, the flange at the lower end of the valve stem seats against the O-ring 126e so that the communication between the branch 126a2 and the corresponding ink outlet is cut off. On the other hand, when the valve 126d is loosened, the valve flange moves away from the valve seat or O-ring 126e so that the ink can flow from the branch 126a2 to the ink outlet.

This embodiment is advantageous in that only one valve 126d is opened so that the position of the corresponding ink emission head 101n can be adjusted in such a manner that the ink jet is issued in a predetermined direction. Thus, all the ink emission heads $101_l$ through $101n$ can be individually adjusted. In addition, the ink emission heads 101₁ through 101n can be selectively abled or disabled.

The second embodiment of an ink circulation system in accordance with the present invention can be modified as follows. The valve seat or O-ring 126e is removed and the bottom of the valve bore is machined or otherwise formed so as to provide a conical valve seat. The lower end of the valve stem is terminated into a conical form which mates with the conical valve seat. When the conical valve is formed with small radial grooves, the stop valve 126d can be used as a pressure regulating valve for controlling the pressure of the ink.

Figure 4C:
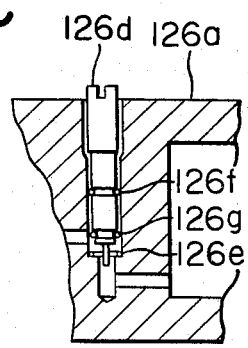
FIG. 4C shows a modification of the embodiment shown in FIGS. 4A and 4B.

Another modification is shown in FIG. 4C. An O-ring 126g is fitted over the valve stem adjacent to the flange valve so that the stop valve 126d can be also used as a pressure regulating valve.

The stop and pressure-regulating valves are advantageous because of the following reason. First, the positions of individual ink emission heads are adjusted one by one in the manner described above so that the desired ink drop trajectory and subsequently ink landing position can be attained. Thereafter, all the ink emission heads are abled or operated by opening all the valves 126d so that the desired ink drop trajectory and ink drop landing position can be attained by adjusting the individual valves 126d so as to optimumly control the ink pressure. Thus, the adjustment of the print head for attaining the desired ink emission characteristics is much facilitated.

Figure 5A:
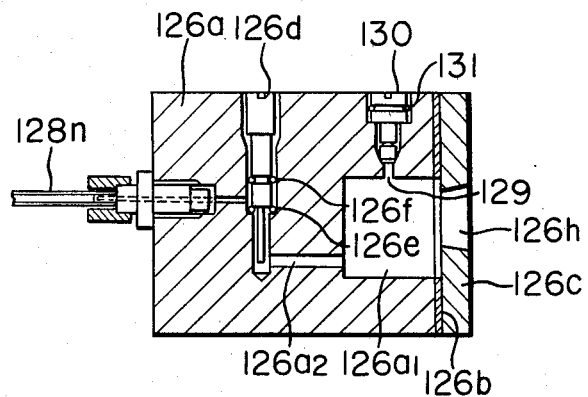
FIG. 5A is a sectional view in elevation of an air vent extend through the top wall of an ink manifold and communicated with a common ink passage or chamber therein.
Figure 5B:
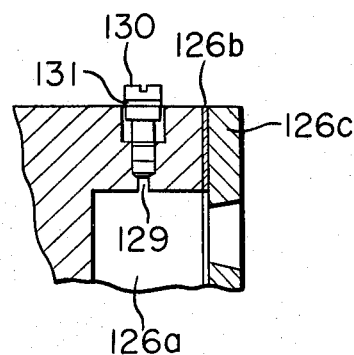
FIG. 5B is a view similar to FIG. 5A but illustrating the air vent in operative position for venting the air trapped in the ink manifold.

When the air is entrained in the ink, it remains as air bubbles. When the air bubbles clog the nozzle, no ink is issued so that an ink drop will not be placed at the position at which it should be placed. In order to prevent such ink drop misplacements, the present invention provides an air vent as shown in FIGS. 5A and 5B. The main body 126a has a stepped vertical hole 129 which consists of a large-diameter upper portion and a small-diameter lower portion and is communicated with the main or common passage 126a1. The large-diameter upper portion of the hole 129 is internally threaded for engagement with the screw threads of a screw 130. The screw 130 has a circumferential groove into which is fitted an O-ring 131 which is normally pressed against the bottom of the large-diameter upper portion or bore so that the leakage of ink can be avoided. When the air is entrained into the ink the screw 130 is loosened until the O-ring 131 comes out of the hole 129 as shown in FIG. 5B so as to vent the trapped air. Thus, the optimum ink emission can be ensured.

What is claimed is:

1. An ink-jet recording device of the type in which ink under pressure is supplied to a plurality of ink emission heads which in turn emit ink jets modulated by periodic pressure variations of a piezoelectric element associated therewith for recording, characterized in that the ink under pressure is supplied from a single source of pressurized ink to an ink manifold with one inlet port and a plurality of outlet ports; and one end of a flexible pipe is connected to each of said outlet ports while the other end thereof is connected to an ink emission head, whereby the ink under pressure is supplied to said ink emission head from said ink manifold.

2. An ink-jet recording device as set forth in claim 1 further characterized in that said ink manifold is hollow and said inlet and outlet ports are communicated with each other through the hollow space.

3. An ink-jet recording device as set forth in claim 1 further characterized in that said ink manifold includes an ink distributor with a plurality of branches which are aligned with said outlet ports and are spaced apart from each other.

4. An ink-jet recording device as set forth in claim 1 or 3 further characterized in that said inlet port is communicated with said outlet ports through ink passages, and an ink flow control means is disposed in each of said ink passages.

5. An ink-jet recording device as set forth in claim 4 further characterized in that said ink flow control means consists of a stop valve.

6. An ink-jet recording device as set forth in claim 4 further characterized in that said ink flow control means consists of a pressure regulating valve.

7. An ink-jet recording device as set forth in claim 4 further characterized in that said ink flow control means consists of a stop and pressure-regulating valve capable of regulating the pressure of ink until said stop and pressure-regulating valve is widely opened.

8. An ink-jet recording device as set forth in claim 5, 6 or 7 further characterized in that one end of a flexible pipe is connected to each outlet port of said ink manifold while the other end thereof is connected to an ink emission head.

9. An ink-jet recording device as set forth in claims 1 through 8 further characterized in that said ink manifold is formed with a common ink passage, and the top wall of said common ink passage is communicated with an air vent means.

10. An ink jet recording device of the type in which ink under pressure is supplied to a plurality of ink emission heads which in turn emit ink jets for recording wherein the ink under pressure is supplied from a single source of pressurized ink to an ink manifold with an inlet port and a plurality of outlet ports; and one end of a flexible pipe is connected to each of said outlet ports while the other end thereof is connected to an ink jet emission head which is adjustable in the horizontal direction.

11. An ink jet recording device of the type in which ink under pressure is supplied to a plurality of ink emission heads which in turn emit ink jets for recording wherein the ink under pressure is supplied from a single source of pressurized ink to an ink manifold with an inlet port and a plurality of outlet ports; and one end of a flexible pipe is connected to each of said outlet ports while the other end thereof is connected to an emission head which is adjustable in the vertical direction.

12. An ink jet recording device of the type in which ink under pressure is supplied to a plurality of ink emission heads which in turn emit ink jets for recording wherein the ink under pressure is supplied from a single source of pressurized ink to an ink manifold with an inlet port and a plurality of outlet ports; and one end of a flexible pipe is connected to each of said outlet ports while the other end thereof is connected to an ink jet emission head adjustable in the horizontal and the vertical direction.

* * * * *